United States Patent

Bohm et al.

[11] Patent Number: 5,413,652
[45] Date of Patent: May 9, 1995

[54] PROCESS FOR MANUFACTURING TIRES WITH WHITE SIDEWALL APPLIQUES

[75] Inventors: Georg G. A. Bohm, Akron; Arthur E. Oberster, Canton; James H. C. Yang, Cleveland, all of Ohio

[73] Assignee: Bridgestone Corporation, Tokyo, Japan

[21] Appl. No.: 215,941

[22] Filed: Mar. 21, 1994

Related U.S. Application Data

[60] Division of Ser. No. 807,913, Dec. 16, 1991, Pat. No. 5,296,077, which is a continuation-in-part of Ser. No. 469,705, Jan. 24, 1990, which is a continuation of Ser. No. 223,195, Jul. 8, 1988, abandoned.

[51] Int. Cl.$^6$ ............... B32B 31/02; B32B 31/18; B32B 31/26; B32B 33/00
[52] U.S. Cl. ................ 156/90; 152/524; 152/DIG. 12; 156/116; 156/264; 156/394.1; 156/421.8; 264/159; 264/163; 264/247; 264/326; 425/32; 425/501; 425/297
[58] Field of Search .............. 156/90, 116, 394.1, 156/395, 110.1, 421.8, 264, 510; 152/524, DIG. 12; 264/159, 163, 245-247, 326; 425/297, 316, 32, 501-502, 38

[56] References Cited

U.S. PATENT DOCUMENTS

| | | | |
|---|---|---|---|
| 1,402,160 | 1/1922 | Gwozdz | 264/163 X |
| 2,126,733 | 8/1938 | Catt | 264/159 |
| 2,566,328 | 9/1951 | Hessney et al. | 156/116 X |
| 2,646,595 | 7/1953 | Leistensnider | 264/159 X |
| 2,874,743 | 2/1959 | Rowe | 156/116 X |
| 3,073,371 | 1/1963 | Leeper | 156/116 X |
| 3,880,688 | 4/1975 | Calori et al. | 156/510 X |

Primary Examiner—Adrienne Johnstone
Attorney, Agent, or Firm—Daniel N. Hall

[57] ABSTRACT

A product and process for imparting decorative appliques to the sidewalls of tires during the curing operation are presented. In one embodiment, a spool of applique composite material is maintained for feeding into a tire mold or onto a transfer device, thereby defining a ring for vulcanization to a tire. The applique consists of a laminate received upon a carrier, the laminate having a first barrier layer and a congruent second decorative layer. The laminate is received by a tire sidewall between two grooves which serve to isolate the decorative layer from the tire itself. In another embodiment a laminate of white and barrier rubber stock is formed and then configured into a cylinder. A plurality of bands are cut from the cylinder then transferred to a fixture by reorienting the bands to conform to the angle of the sidewall of the tire at the point with which the band is to be adhered. The band is then transferred to a tire curing press which subsequently receives a green tire, with the band and tire being simultaneously cured, achieving a bond of the band to the tire by vulcanization.

5 Claims, 7 Drawing Sheets

PROCESS FOR MANUFACTURING TIRES WITH WHITE SIDEWALL APPLIQUES

CROSS-REFERENCE TO RELATED APPLICATIONS

This is a divisional application of Ser. No. 07/807,913, filed Dec. 16, 1991 now U.S. Pat. No. 5,296,077 continuation-in-part of prior U.S. patent application Ser. No. 469,705, filed Jan. 24, 1990, which was a continuation of Ser. No. 223,195, filed Jul. 8, 1988 now abandoned.

TECHNICAL FIELD

The invention herein resides in the art of the manufacture of pneumatic tires and, more particularly, to the manufacture of such tires having white sidewalls. Specifically, the invention relates to a method and apparatus for manufacturing and applying white sidewall appliques to a tire during the tire curing process.

BACKGROUND ART

The manufacture of tires is significantly complicated by the imparting of decorative bands into a tire sidewall to form a "white sidewall" tire. Presently, this is accomplished by fabrications using the extrusion and calendering of a number of black and white components which are subsequently combined into a decorative sidewall preassembly. All of the tire components, including the tire sidewall preassembly, are then applied in sequence to the tire building drum to form the green or uncured tire. Following the tire curing operation, the decorative sidewall side of the tire is carefully ground and buffed to expose the decorative sidewall area which was previously protected by a cover strip. These complex steps detrimentally effect the efficiency of the tire manufacturing process. Further, many interfaces produced in construction of the decorative sidewall tire effect the structural integrity of the tire and its durability and performance on the road.

It is generally known in the tire industry that the tire carcasses used for forming a blackwall tire are different from those employed in manufacturing tires having decorative features or "white sidewalls" thereon. Further, modern tires are designed with increasingly thinner sidewalls, such that the decorative portion of the sidewall is becoming an increasingly significant part of the tire sidewall structure itself. Since the decorative portion is typically less than optimum as a structural element, it is becoming increasingly difficult to manufacture modern tires having sidewalls with decorative features thereon. Previously known tires with decorative sidewalls have been characterized by a plurality of boundaries defining the different layers of the decorative structure, each boundary presenting an area for the development of a potential defect.

To obviate the shortcomings of the prior art, it has been proposed to replace the previously known sidewall decorative features with appliques of polymeric paint applied to stock blackwall tires after the curing operation on the tire. Such structures and techniques are taught in U.S. Pat. Nos. 4,767,481, 4,684,420, 4,699,193, and 4,684,431, all assigned to Bridgestone/Firestone, Inc. The appliques of these patents are quite thin, on the order of 0.003 inch and, accordingly, susceptible to damage by scrapping, scuffing, and the like. While the appliques are designed to be scuff resistant, and the tire receiving such appliques is configured to protect the same from scuffing, the inherent thin nature of the appliques gives rise to concern over damage resulting from use.

In the past, some attempts have been made to manufacture elastomeric appliques for use in the manufacture of whitewall tires. However, such prior techniques have proven to be time consuming and costly. Previously, single rings of an elastomeric material have been extruded upon a carrier for placement in a tire mold and for transfer by vulcanization to the tire during the curing operation. However, these prior attempts have not demonstrated an ability to be cost effective and reliable. Accordingly, there is a need for an automated method of producing whitewall appliques for vulcanization to a tire during the curing operation.

DISCLOSURE OF INVENTION

In light of the foregoing, it is a first aspect of the invention to provide a process and apparatus for manufacturing white sidewall appliques which is cost effective and automated.

Another aspect of the invention to provide a tire having a decorative applique and a process for making the same in which a blackwall tire may be selectively employed.

Yet another aspect of the invention is the provision of a process and apparatus for manufacturing white sidewall appliques which is given to mass production.

Yet a further aspect of the invention is the provision of a process and apparatus for manufacturing white sidewall appliques which allows for the bonding of the applique to the tire by vulcanization during the tire curing process, and in which the formation of the applique and transfer thereof to the tire curing mold is achieved in an automated fashion.

Another aspect of the invention is the provision of a tire having a decorative applique and the process for making the same in which such process is a simple one, eliminating the steps and material previously used for co-extruding and assembling a sidewall band or decorative material.

Still a further aspect of the invention is the provision of a tire having a decorative applique and the process for making the same in which little or no waste is experienced in the manufacturing process.

An additional aspect of the invention is the provision of a tire having a decorative applique and the process for making the same which is given to numerous and varying designs, colors, configurations, and the like.

Another aspect of the invention is the provision of a tire having a decorative applique and the process for making the same in which tire integrity is enhanced by reduction of the number of components comprising the decorative portion.

Yet a further aspect of the invention is the provision of a tire having a decorative applique and the process for making the same in which the sidewall construction is uniform, with no interruptions or changes of materials or modulus therein.

Still a further aspect of the invention is the provision of a tire having a decorative applique and the process for making the same in which the applique is actually cured or vulcanized to the tire.

The foregoing and other aspects of the invention which will become apparent as the detailed description proceeds are achieved by an apparatus for applying a white sidewall applique to a tire, comprising: first means for mixing and calendering a layer of barrier rubber compound; second means for mixing and calendering a layer of white rubber compound; a laminator receiving said layers of barrier and white rubber compounds and laminating said layers together, forming a laminate; third means for forming a cylinder of said laminate and cutting said cylinder into a plurality of bands; and fourth means for transferring individual bands from said third means to a tire curing press.

Other aspects of the invention are attained by a method for applying a white sidewall applique to a tire, comprising the steps of: mixing and calendering a layer of barrier rubber; mixing and calendering a layer of white rubber; laminating said layer into a laminate; forming a cylinder of said laminate and cutting said cylinder of laminate into a plurality of bands; and transferring one of said bands to a tire curing press and vulcanizing said band to a tire while curing said tire.

DESCRIPTION OF DRAWINGS

For a complete understanding of the objects, techniques and structure of the invention reference should be made to the following detailed description and accompanying drawings wherein.

BEST MODE FOR CARRYING OUT THE INVENTION

Figure 1:
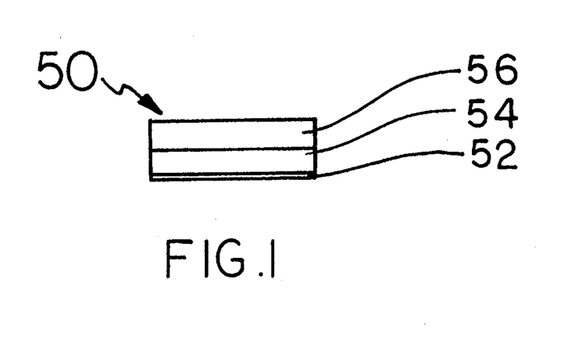
FIG. 1 is a cross sectional view of an applique ribbon according to the invention.

The invention contemplates the utililization of a ribbon of applique material which may be either laid directly into a tire mold or, alternatively, be formed upon a transfer ring or device for subsequent placement into the mold. FIG. 1 presents a cross-sectional view of such an applique ribbon or tape 50. As shown, the ribbon 50 includes a carrier or release liner 52 which receives thereupon a barrier layer 54 which, in turn, receives a white or decorative outer layer 56. In a preferred embodiment of the invention, the release liner 52 is a thin polymeric film having a thickness of 0.001–0.004 inch and, most preferably, 0.002 inch. The barrier layer 54 is provided to prevent the transfer therethrough of antioxidants and/or other staining or discoloring pigments in tire sidewall stocks. This barrier layer is preferably comprised of chlorobutyl-containing rubber compounds or any halobutyl-containing rubber stock. It has also been found that vinyl alcohol copolymers and epichlorhydrin copolymers may serve the desired purpose. While it has previously been known to use these materials as an air or oxygen barrier, it has not been known to use the same for a barrier for antioxidants, antiozonants or other rubber additives. Finally, the white or decorative outer layer 56 is preferably a conventional white sidewall composite such as a mix of EPDM and chlorobutyl rubber or zinc methacrylate based composite. It is most preferred that the combination of the layers 54, 56 are uncured or only partially cured to a degree necessary to facilitate handling. This uncured or partially cured state allows for ease of vulcanization bonding to the tire during the curing process as will be discussed hereinafter.

The barrier layer 54 and decorative layer 56 are preferably of the same width, and it is further desired that the carrier release liner 52 is also of such width. In other words, the liner and layers 52–56 are preferably congruent. In the preferred embodiment, the barrier layer 54 has a thickness of 0.01–0.07 inch, and preferably 0.03 inch. The decorative layer 56 is a thickness of 0.03–0.10 inch, and preferably 0.055 inch. The width of the ribbon 50 and the constituent layers and liner is on the order of 0.3–1.0 inch, and preferably 0.55 inch.

Figure 2:
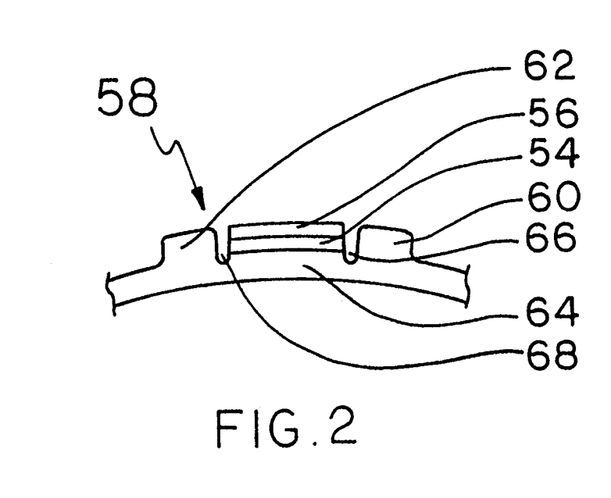
FIG. 2 is a partial cross sectional view of a tire sidewall shown receiving the applique of FIG. 1.

As shown in FIG. 2, the ribbon of FIG. 1, having the release liner 52 removed, may be used to form a decorative applique on the sidewall of a tire 58. Preferably, a tire employing this type of applique will include an inner rib 60 positioned on the side of the applique nearest the tire bead, and an outer rib 62 on the side of the applique nearest the tread. A raised land or plateau 64 is maintained between the two ribs and separated therefrom by respective separation grooves 66, 68. These grooves have a width on the order of 0.03–0.10 inch, and most preferably, 0.06 inch. The purpose of these separation grooves is to prevent bleeding from the tire sidewall 58 into the side edges of the decorative layer 56. Accordingly, the decorative layer 56 is protected from the tire on the bottom by the barrier layer 54 and on the sides by the gaps defined by the grooves 66, 68.

It will be appreciated that the barrier layer 54 is black rubber and serves to mate with a correspondingly black tire. During the curing operation, any flow of the laminate 54, 56 will be at the interface between the tire 58 and the laminate 54, 56. Flow from the bonding surface between the barrier layer 54 and the land 64 is black in color and therefore undetectable. Accordingly, the decorative surface 56 has a characteristic clean, crisp, and well defined appearance. It will, of course, be appreciated that a tire mold used in accordance with the invention includes a sidewall configuration which forms the grooves 66, 68 and the ribs 60, 62, while accommodating the laminate 54, 56.

It is also contemplated within the invention to form the portion of the sidewall of the tire 58 of a nonstaining black rubber compound formed as an inlay to the sidewall of the tire 58 and constituting substantially that portion shown in FIG. 2. In other words, at least the land 64 and the ribs 60, 62 would be formed of such a nonstaining rubber composition. In such a case, the laminate applique ribbon or tape 50 would be the same as in FIG. 1, but the layer 54 would no longer need to be a barrier layer, but could simply be formed of any suitable nonstaining black rubber compound employed in tire manufacture. The black layer 54 would still serve the purpose of assuring that the decorative layer 56 maintains its characteristic clean, crisp, and well defined appearance as discussed above.

Figure 3:
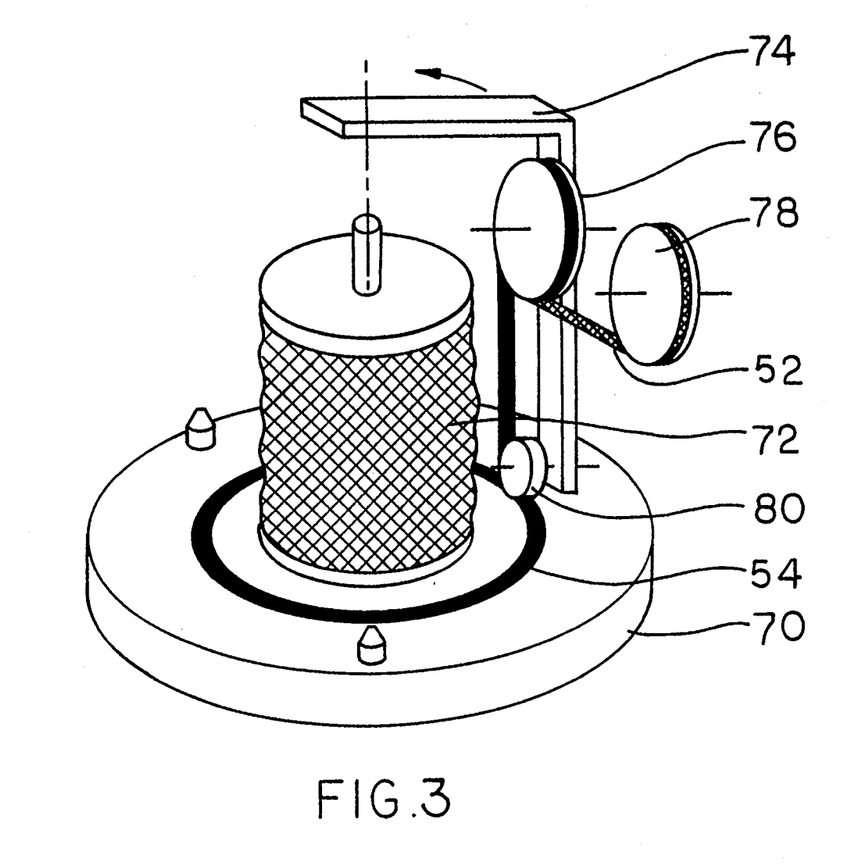
FIG. 3 is an illustrative drawing of an apparatus for applying the applique ribbon of FIG. 1 directly to a tire mold.

A first concept of these embodiment of the invention anticipates the application of the applique ribbon or tape 50 directly to the tire mold itself. This concept is best shown in FIG. 3 wherein a tire mold 70, having a typical bag or bladder 72 maintained therein is characterized by the presence of a rotatable frame member 74. The frame 74 is adapted for rotation about the center of the tire mold 70 and carries thereon a spool 76 of the ribbon 50. A take-up roll 78 is provided for stripping the release liner 52 from the ribbon 50. An application roller 80 is maintained at the bottom of the frame 74 and in ribbon-applying engagement with the tire mold 70. The application roller 80 rolls the applique composite 54, 56 into a groove in the mold 70, cuts an appropriate length of the composite, and splices the same at the two ends to define a ring-like applique as typifies a "white sidewall" tire. After the applique has been placed or laid in the mold groove, cut and spliced, the rotatable frame member 74 and the attached reels 76, 78 and roller 80 are removed from the mold.

Figure 4:
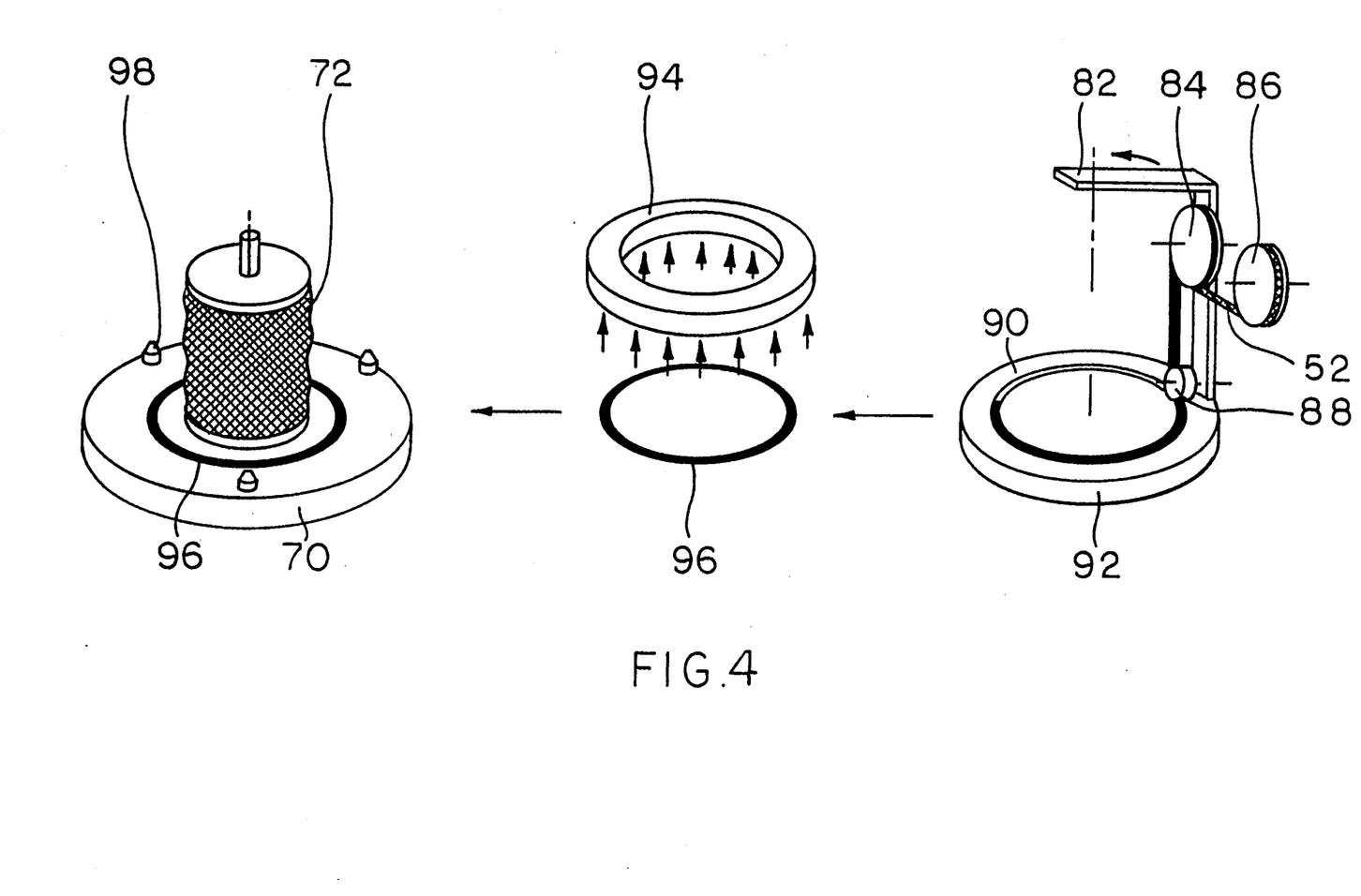
FIG. 4 is an illustrative drawing of an apparatus for forming an applique from the ribbon of FIG. 1 for subsequent transfer to a tire mold.

In FIG. 4, there is shown an apparatus and technique for prefabricating an applique from the ribbon 50 apart from the tire mold, for subsequent movement to and placement of the applique within the tire mold. As shown, a frame 82 is again adapted for rotation about a center point. The frame 82 carries a spool 84 of ribbon 50 and includes a take-up roll 86 for stripping and receiving the release liner 52 from the ribbon. An application roller 88 is maintained at the bottom of the frame 82 for purposes of urging the composite 54, 56 into a cavity 90 of the forming fixture or disk 92. It should be noted at this time that the fixture or disk 92 might itself be rotatable while the frame 82 remains fixed. In either event, relative rotation between the two elements is necessary to place the applique into the cavity 90.

Once the applique has been formed in the cavity 90, appropriately cut and spliced, the frame 82 is pivoted away from the fixture 92 and an appropriate transfer device such as the vacuum ring 94 moves over the fixture 92 for purposes of removing the formed applique such that a subsequent applique may be fabricated. The vacuum ring 94 simply comprises an annular disk having a plurality of apertures in a bottom surface thereof and appropriately connected to a vacuum source. The ring 94 is placed over the applique within the cavity 90 and makes a securing engagement therewith, subsequently lifting the applique from the cavity 90 for movement to the tire mold 70. The applique 96, comprising layers 54, 56 is maintained by vacuum upon the bottom surface of the vacuum ring transfer device 94 and is assisted into position within the tire mold 70 by means of appropriately positioned guide pins 98. At that point, the vacuum is terminated and the applique 96 is released into an appropriate groove in the mold 70. Obviously, the vacuum ring transfer device 94 is appropriately pivotal or moveable to accomplish this feature. After placement in the tire mold, a green tire is placed therein, the bag 72 inflated, the mold closed, and standard curing processes are employed. At that time, the applique 96 is bonded by vulcanization to the tire sidewall.

It should be appreciated that the fixture 92 could be an annular ring or disk adapted to be retrieved by the vacuum ring transfer device 94 and maintained along with other similar rings or disks in an appropriate cassette or stack for placement into the tire mold 70. In other words, a new ring or disk 92 would be placed in association with the frame 82 each time an applique 96 was to be formed. After forming, the ring 92 carrying the applique 96 would be retrieved and stored for eventual placement in association with a tire mold. At that time, the entire ring, carrying the applique 96, could be placed within the mold 70 as by a vacuum ring transfer device 94, or could be subsequently stripped from the ring 92 such that only the applique 96 is placed within the mold.

Irrespective of whether the applique is formed within the tire mold or apart from the tire mold, the key to the concept of this embodiment of the invention is the ability to form and splice a sidewall applique into a circular configuration. In general, such a forming method can be achieved by the structure shown hereinafter with respect to FIGS. 5-7.

Figures 5, 6, 7:
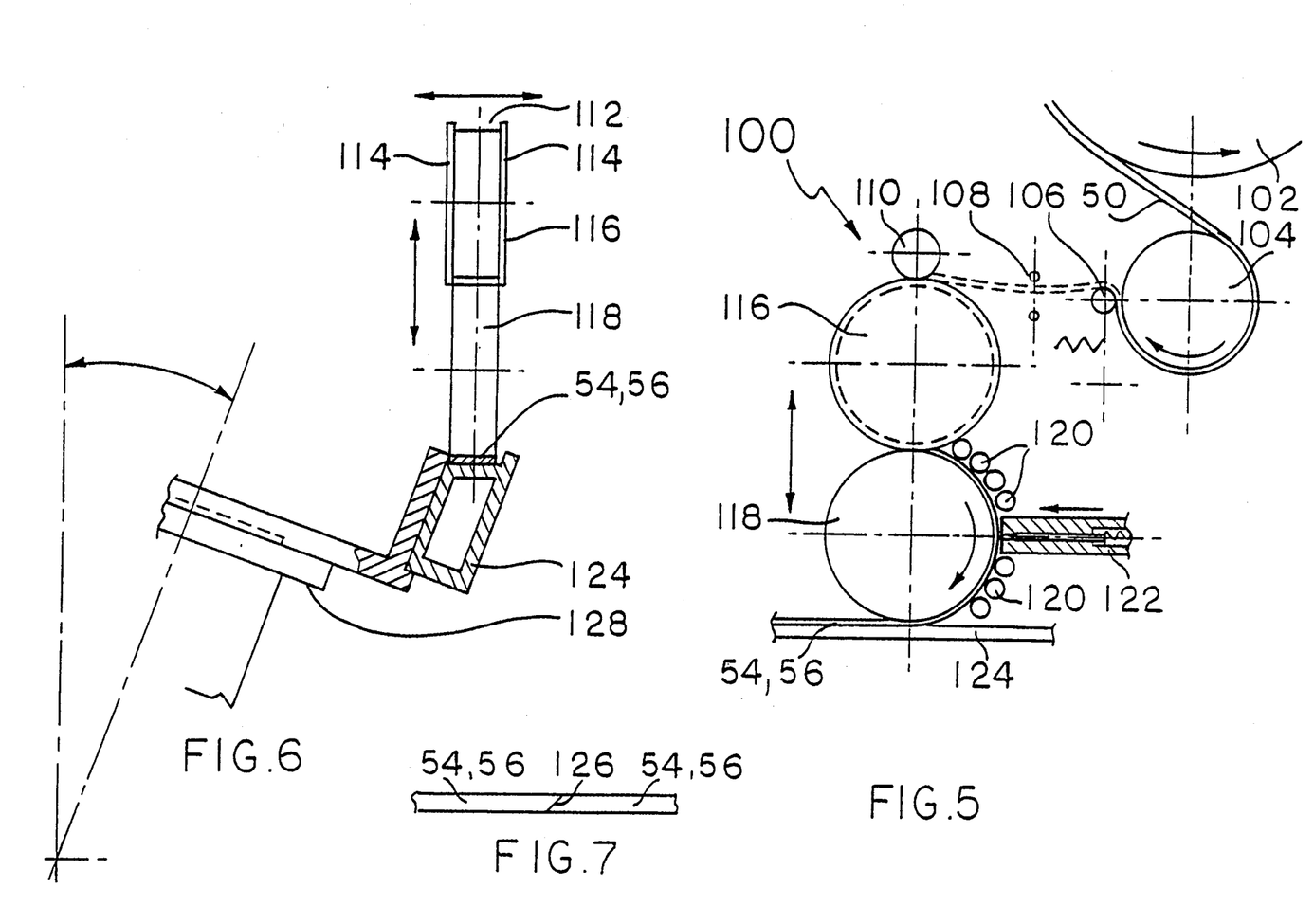
FIG. 5 is a schematic drawing of an apparatus for forming an applique from the ribbon of FIG. 1 upon a white sidewall forming fixture.
FIG. 6 is an illustration of the turntable in conjunction with the ribbon-laying rolls of FIG. 5.
FIG. 7 is a cross sectional view of a splice of an applique formed by the apparatus of FIG. 5.

As shown in FIG. 5, an applique forming system is designated generally by the numeral 100. A spool 102 maintaining ribbon 50 thereon is provided as part and parcel of the system. As will be appreciated, the spool 102 is an idler spool, and only rotates when the ribbon 50 is drawn therefrom. A driven roller 104 also serves as a take-up roller to strip the liner 52 from the ribbon 50. A spring-biased idle roller 106 is maintained in juxtaposition to the roller 104 such that the composite 54, 56 passes thereover once the liner 52 has been removed.

The composite 54, 56 passes between limit switches 108. These limit switches assure that the proper tension is maintained in the traveling web of the composite 54, 56 to prevent stretching or shrinking thereof. The top switch, if contacted, indicates that the speed of the web should be slowed down, while the bottom switch, if contacted, indicates that the speed of the web should be increased. By maintaining the web between the two limit switches 108, proper tension is maintained within the web.

The web of material then passes between a nip roller 110 and a ribbon laying head or roller 116. The nip roller 110 is received within a groove 112 formed between the side disk 114 of the roller 116. The depth of the groove 112 is substantially equal to the thickness of the composite 54, 56. The side disks 114 are spaced apart a distance subsequently equivalent to the width of the composite 54, 56 to maintain the composite in a well defined posture.

The composite 54, 56 travels about the roller 116 and then between the guide wheels 120 and the drive roll 118. The guide wheels 120 are provided to maintain alignment and registration of the ribbon composite 54, 56. A cutting knife 122 which is spring loaded, and which may also be heated, is positioned in juxtaposition to the drive roll 118. The drive roll 118 is indexed so that the amount of composite ribbon 54, 56 laid off of the roll 118 may be accurately measured. When an appropriate length has been laid, the knife 122 is actuated to cut the ribbon 54, 56 at the appropriate point and angle.

As shown in FIG. 6, the drive roll 118 lays the composite 54, 56 onto a white sidewall forming device 124. It will be appreciated that the white sidewall forming device 124 may carry a ring which may be removed with the applique secured thereto for storage in a cassette adjacent to the tire molds. When required by the mold, robotic removal from the cassette and application to the tire mold may be achieved as is within the capabilities of those skilled in the art.

As just mentioned, a turntable 128 is provided for receiving the white sidewall forming device 124. Accordingly, the turntable rotates to receive the composite 54, 56 from the wheel 118. Obviously, the turntable 128 and roller 118 are appropriately geared or indexed together such that the feed rate of the web 54, 56 there onto is proper and appropriate.

As shown in FIG. 7, the splicing of the composite 54, 56 is achieved by the knife 122 making a cut through the thickness of the composite at an appropriate angle for a mitered fit, typically less than 90°. Since the composite 54, 56 is comprised of uncured rubber, the ends of the splice readily mate with each other and join for subsequent curing. By making an appropriate angled cut with the knife 122, the splice 126 is not only uniform, but each cut of the composite 54, 56 defines a new beginning for the subsequent applique formation such that no waste is experienced in the operation.

Figures 8, 9, 10:
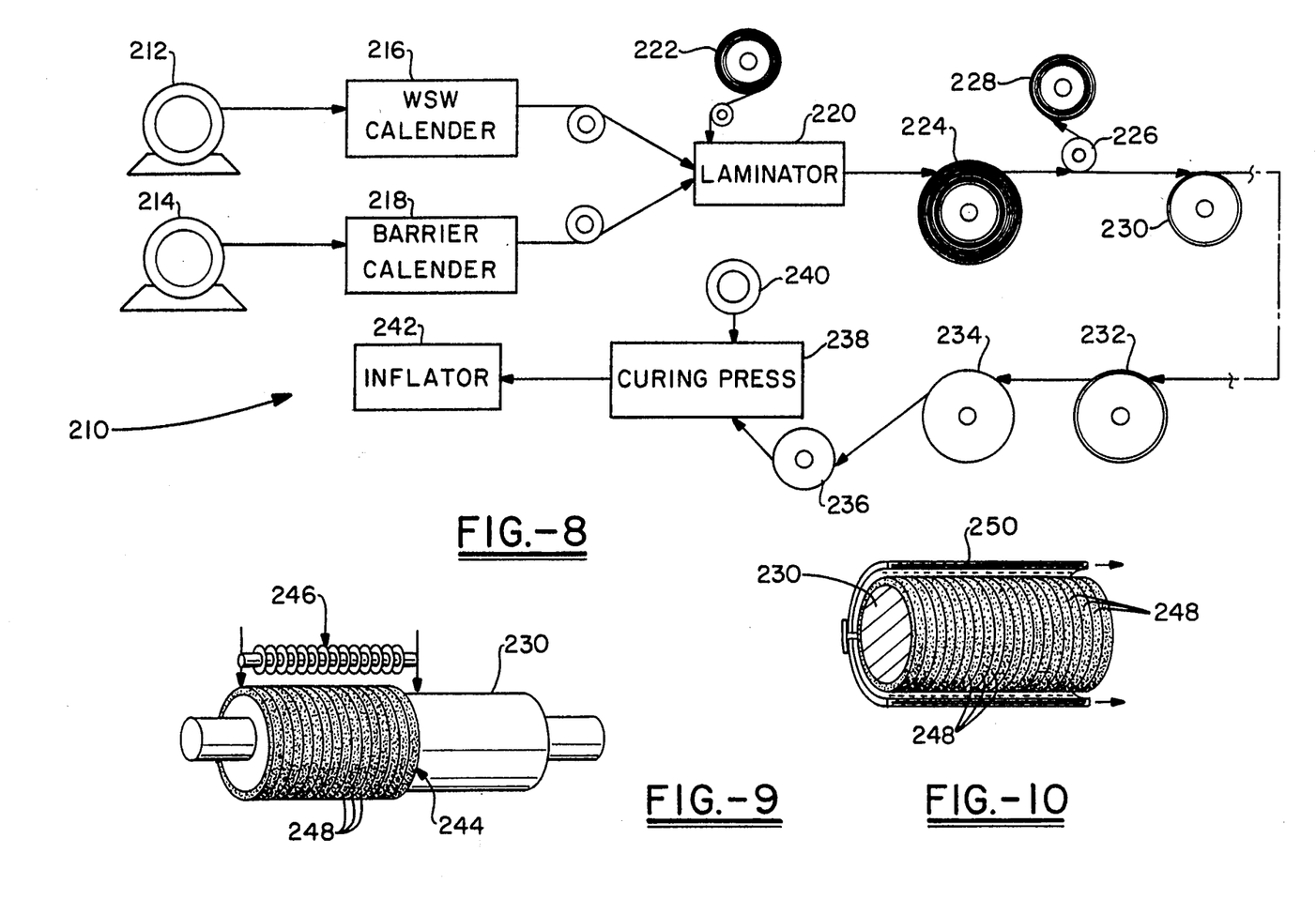
FIG. 8 is a flow diagram of a method of another embodiment of the invention.
FIG. 9 is a perspective view of the storage cylinder and cutter assembly employed in the embodiment of FIG. 8.
FIG. 10 is a perspective view of the apparatus for transferring cut bands from the device of FIG. 9 to a storage cylinder.

Referring now to the drawings and more particularly FIG. 8, it can be seen that a system for manufacturing and applying white sidewall appliques according to another embodiment of the invention is designated generally by the numeral 210. As shown, a white sidewall mixer 212, of the conventional banbury type, is employed to generate an appropriate white sidewall compound having customary anti-oxidants, anti-staining agents, and the like. In like manner, a conventional banbury mixer 214 may be employed to provide a compound of barrier rubber adapted to prevent the transfer of stain from the tire to the white sidewall mix generated by the mixer 212. The compound from the mixer 212 is passed to an appropriate calender 216 from which a layer of white sidewall compound of uniform thickness is calendered or extruded. The thickness of such layer is on the order of 40–80 mils, and preferably 60 mils. Similarly, a layer of barrier compound of uniform thickness is extruded or calendered by means of the calender 218. The layers so extruded will have a thickness on the order of 25–40 mils, and preferably 35 mils. The layers from the calenders 216, 218 are laminated together at the laminator 220, with the laminate being applied to a backing material taken from a spool or roll 222. The backing material 222 may be fabric, paper, or other suitable material having an appropriate release layer or coating thereon.

The laminate of white sidewall and barrier compounds, received upon the backing material 222, is taken up by a storage roll 224 where the material is maintained until a need for the same is apparent in the manufacturing process. At such time, a stripping roller 226 removes the backing paper 222 from the laminate, with the backing paper being taken up by the wind-up roll 228. The laminate with white sidewall and barrier stock is then applied to a band forming roll 230 where a length of the laminate sufficient to cover the roll 230 is cut. In the preferred embodiment of the invention, the web of laminate is cut through the thickness thereof on a bias with the ends being mated and "stitched" in standard fashion. Cutting of the laminate on a bias through the thickness thereof increases the size of the mating faces of the laminate at the splice, facilitating the stitching operation. Accordingly, a cylinder of laminate is maintained upon the band forming roll 230, such cylinder then being cut into bands of predetermined width. These bands may be transferred to a band storage cylinder 232 or may remain on the roll 230 which will serve as the storage cylinder. As will become apparent later herein, in the preferred embodiment of the invention each of the bands cut from the laminate cylinder maintained upon the band forming roll 230 has a width approximately equal to, but slightly less than, the width of the white sidewall band to be manufactured upon the tire.

A white sidewall forming fixture 234 is maintained in communication with the band storage cylinder 232 and is adapted to receive single bands from the cylinder 232 and to reorient the band from the cylinder 232 to the same orientation that the band will take upon the tire to which it is to be applied. A transfer device 236 then takes the band from the forming fixture 234 and places the same within a tire curing press 238. In standard fashion, the tire curing press 238 is also adapted to receive a green tire 240 and to cure the same under the application of heat and pressure over an appropriate period of time. During such process, the uncured white sidewall laminate and the green tire are vulcanized together such that the white sidewall becomes an integral part of the tire, bonded thereto by the vulcanization process. The cured tire, bearing the white sidewall, is then removed from the curing press 238 and passed to the inflator 242 where it is inflated to determine its suitability for use.

With reference now to FIG. 9, a detailed appreciation of the band forming roll 230 may be seen. As presented above, the laminate 244 of white and barrier stock is wrapped about the roll 230, cut on a bias and spliced or stitched to form a cylinder of laminate 244 of uniform thickness about the roll 230. A cutter 246, comprising a plurality of equally spaced rotary blades is brought into contact with the laminate cylinder 244 to cut the same into bands of widths established by the spacing of the blades of the cutter 246. The bands 248 formed thereby have a width approximately equal to that of the desired sidewall band, and a thickness which is uniform throughout the band.

Figure 11:
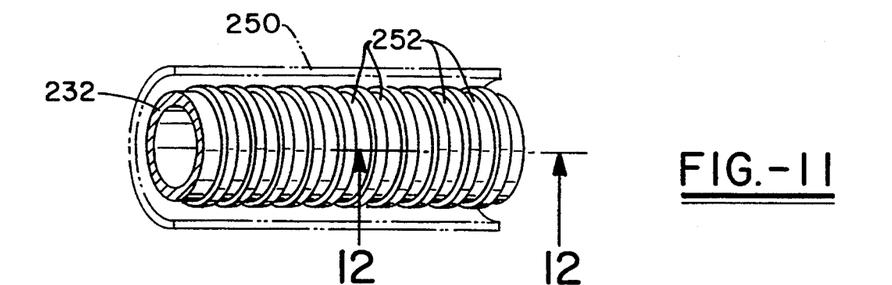
FIG. 11 is a perspective view of the storage cylinder receiving the bands from the structure of FIG. 10.
Figure 12:
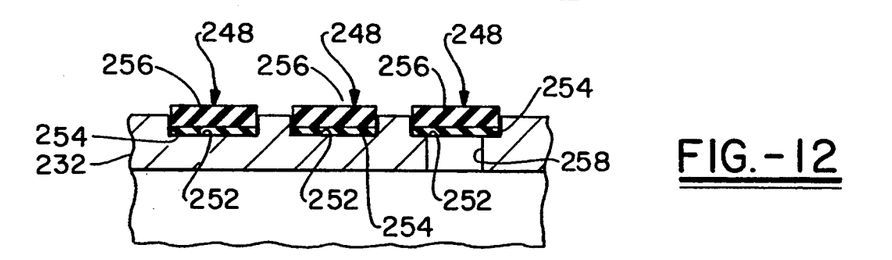
FIG. 12 is a partial cross sectional view of the storage cylinder of FIG. 11, taken along the line 12—12.

As shown in FIG. 10, a vacuum sleeve 250 or other appropriate transfer device is received over the band forming roll 230 and is axially movable with respect thereto. The vacuum sleeve 250 may include a plurality of vacuum rings spaced according to the spacing of the bands 248 upon the roll 230, such that individual rings can engage individual bands. Additionally, the vacuum rings can be separately controlled so that selected bands 248 may be secured and released. In any event, the vacuum sleeve 250 is adapted to retrieve the bands 248 from the roll 230 and to transfer the same to the band storage cylinder 232. As shown in FIGS. 11 and 12, the storage cylinder 232 preferably comprises a plurality of spaced circumferential grooves 252 adapted to receive the bands 248 and to maintain the same in axially aligned spaced relationship to each other. Those skilled in the art will appreciate that with appropriate control of vacuum sleeve 250 so as to the actuation and release of selected bands 248, coupled with the axial indexing of the sleeve 250 with respect to the band storage cylinder 232, assures the depositing of select bands 248 into uniquely associated grooves 252. As further shown in FIG. 12, each of the bands 248 comprises a barrier layer 254 which is received in the groove 252, and maintained upon a white sidewall layer 256, the face of which is exposed from the groove 252.

With continued reference to FIG. 12, it can be seen that a segmented passage 258 is present within the wall of the roll 232 and in communication with a groove 252 at the end of the roll 232. The passage 258 is interrupted periodically by the material of the drum 232 to maintain the integrity thereof. It is contemplated that the segmented passage 258 may encompass approximately 300° of the 360° in the circumference of the drum 232.

Figure 13:
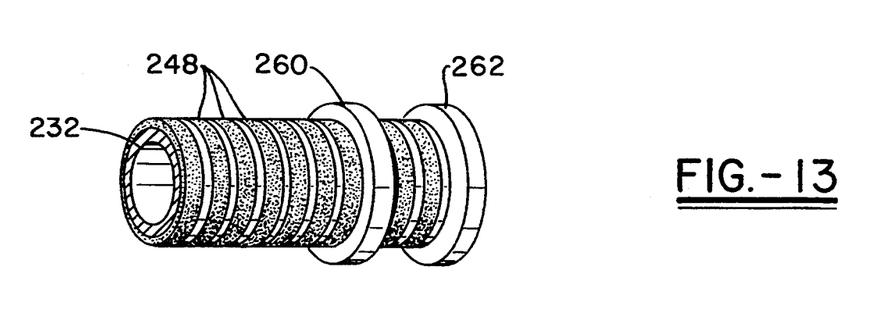
FIG. 13 is a perspective view of a white sidewall forming fixture according to the invention.

When it is desired to form white sidewall bands from the bands 248, the band storage cylinder 232 will typically be vertically oriented, with the groove 252 having the passage 258 associated therewith positioned at the bottom thereof. As shown in FIG. 13, a vacuum transfer ring 260 is then received over the cylinder 232. The transfer ring 260 is configured to receive and secure individual bands 248 to move selected bands to the lowermost groove 252 of the cylinder 232 so that the same can then be urged from the bottom groove 252 into a white sidewall forming fixture 262 positioned at the bottom of the cylinder 232. As shown, the fixture 262 is axially aligned with the cylinder 232 and is orthogonal thereto.

Figure 14A:
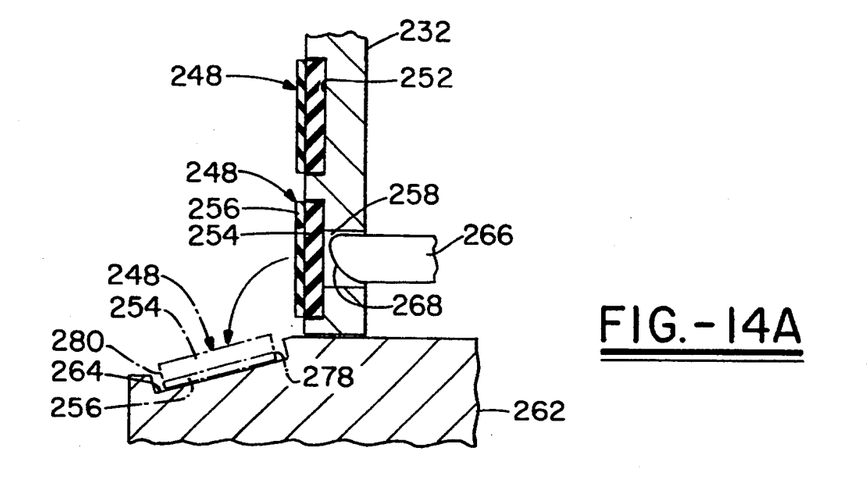
FIGS. 14A—14C are partial cross sectional views of alternate forming fixtures according to the invention.

As shown in FIG. 14A, the fixture 262 is provided with a circular groove 264 centered about the axis of the cylinder 232 and fixture 262. The groove 264 has a width which is slightly greater than the width of the bands 248 and depth which is slightly less than the thickness of the bands 248 such that the cross sectional area of the groove 264 is substantially equal to the cross sectional area of the band 248. Accordingly, the total volume of the groove 264 will be substantially equal to the total volume of the band 248. As further shown, the groove 264 is angled downwardly from the horizontal at an angle of 10°–15°, corresponding to the curvature of the tire at the point on which the sidewall band is to be applied. In a preferred embodiment of the invention, this angle is on the order of 13°.

An extendable rotating finger or spatula 266 is maintained within the cylinder 232 and communicates with the openings 258 in a manner to achieve removal of the band 248 from the lowermost groove 252 and to deposit the same into the groove 264 of the fixture 262. As shown in FIG. 14A, the spatula 266 extends radially through the opening 258 and into the contact with the band 248, urging the same from the groove 252. The spatula 266 is then caused to rotate, causing the band 248 to fold or roll out of the groove 252 and into the groove 264 of the forming fixture 262. It will be appreciated that there may be provided a separate finger or spatula 266 for each of the openings or passages 258, or a single such spatula may be employed, the same being retracted to pass over the webbing of the cylinder 232 which breaks up the passage 258. It should also be noted that the finger or spatula 266 is provided with a curved or radiused edge 268 so as not to damage or mar the band 248. It will be noted that engagement of the spatula 266 is against the barrier stock layer 254. It will further be appreciated that the white sidewall stock 256 is received in contacting engagement with the groove 264, with the barrier stock layer 254 being exposed. Such orientation further serves to protect the white sidewall surface from being marred or damaged.

Various other devices and methods may be employed to remove the bands 248 from the storage roll 232 for deposit and formation in the groove 264 of the fixture 262. For example, in FIGS. 14A, 14B and 14C, various embodiments are shown in which neither the cylinder 232 nor the fixture 262 rotate, but remain stationary. In FIG. 14A, a plurality of circumferentially uniformly spaced fingers or spatulas communicate through associated openings 258 to urge the bottom most ring 248 from the cylinder 232 and onto the fixture 262. The fingers 266 are hydraulically or pneumatically actuated for extension and retraction.

Figure 14B:
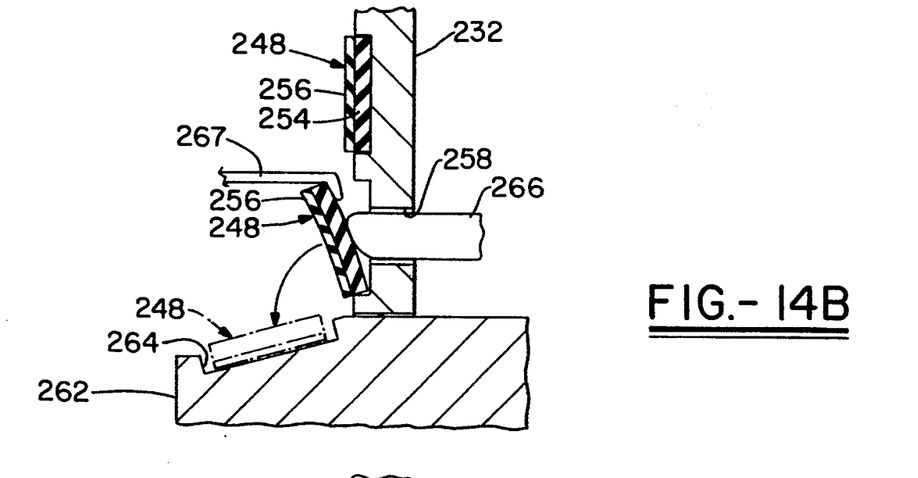

In the embodiment of FIG. 14B, external spatulas or fingers 267 are uniformly circumferentially spaced about the cylinder 232 to grab an exposed top surface of the lower most band 248 and to pull it from the cylinder 232 and into the groove 264 of the fixture 262. The external fingers 267 may be aided by the internal fingers 266 which, like those of FIG. 14A, urge the band 248 outward to expose the top surface thereof for engagement by the external fingers 267.

Figure 14C:
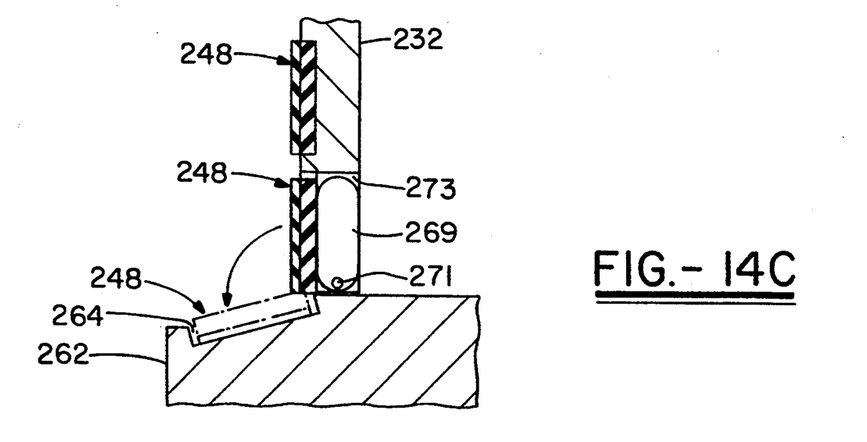

In FIG. 14C, a plurality of plates 269, pivotally hinged as at 271, are operatively positioned to rotate through associated vertical slots 273 to urge the lower most band 248 into the groove 264, as shown. As in the prior embodiments, the plates 269 may be pneumatically or hydraulically attached.

Figure 14D:
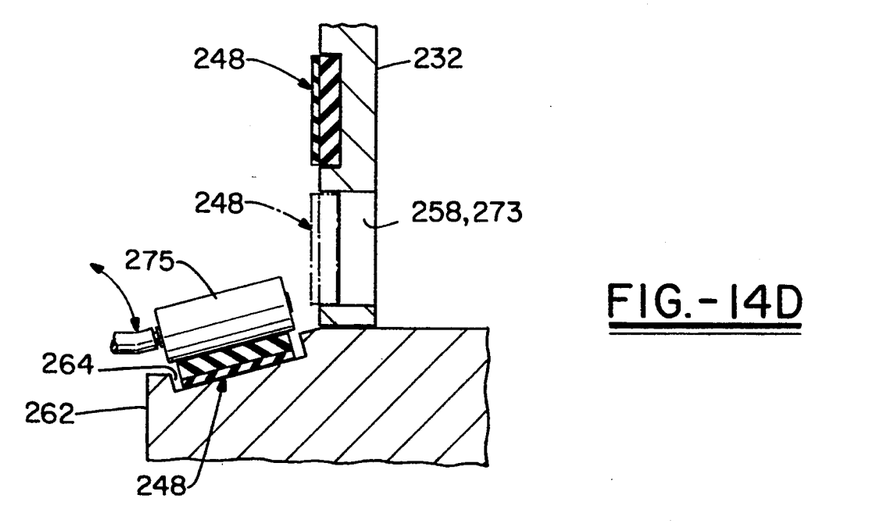
FIG. 14D is a partial cross sectional view of a forming fixture according to the invention which employs a roller for urging the bands into a fixture groove.

As a part of the instant invention, it is also contemplated that a portion of the band 248 may be initially urged onto the fixture 262, with the remainder of the band 248 being subsequently transferred by other mechanical means. For instance, in FIG. 14D a portion of the lowermost band 248 is urged into the groove 264 and a roller 275 is then urged against the band 248 within the groove. Then, relative rotation between the roller 275 and cylinder 232 deposits the remaining portion of the band 248 into the groove 264. In this embodiment, the band 248 may initially be urged into the groove 264 by a single spatula or finger 266, by a single pair of inner and outer fingers 266, 267, or by a single hinged plate, each of the type discussed above. The roller 275 would be hydraulically or pneumatically actuated to contact the deflected portion of the band as aforesaid.

It will be appreciated by those skilled in the art that the urging of the band 248 from the groove 252 and into the groove 264 of the fixture 262 causes some stretching in the band 248. For example, as shown in FIG. 14A, the inner circumferential edge 278 of the band 248 will not dimensionally change, but the circumference thereof will remain substantially the same as it is transferred from the groove 252 to the groove 264. However, the outer circumferential edge 280 of the band 248 will increase by an amount directly proportional to the total width of the band 248, this occurring because the axis of the band 248 has remained the same, but the orientation of the band has passed through an angle of 100°–105°, and in the preferred embodiment 103°.

Those skilled in the art would readily appreciate that, since the circumference of a circle is equal to pi times the diameter, for a white sidewall band having a width of ½ inch, the total difference between the inside and outside diameters of the band will be 1 inch and, accordingly, the outside circumferential edge 280 will have increased by 3.14 inches during the process of transferring the band 248 from the cylinder 232 to the fixture 262 to form the white sidewall band. The rubber stock comprising the layers 254, 256, being elastomeric and forgiving, and further being uncured, readily accommodates such stretching without objectionable distortion.

Figure 15A:
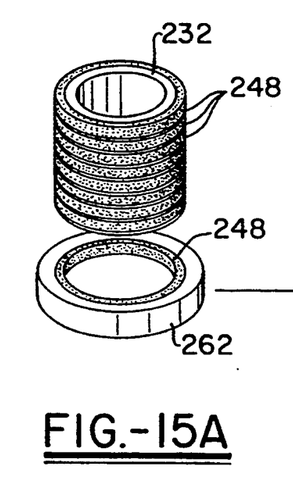
FIGS. 15A—15C are illustrative views of the white sidewall forming and transfer mechanism for depositing a white sidewall applique in a tire curing mold.
Figure 15B:
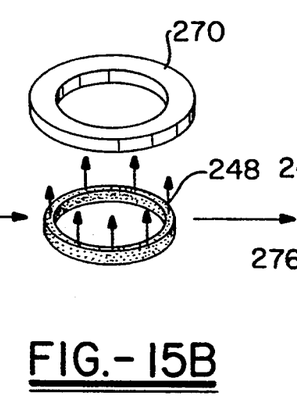
Figure 15C:
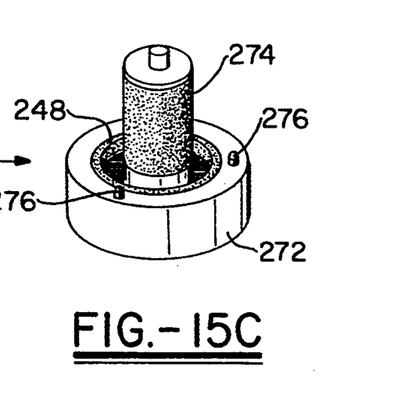

With the band 248 positioned within the fixture 262, there need only be a transfer of the band 248 to the tire curing mold to now effect bonding or vulcanization of the white sidewall band to the tire during the tire curing operation. To this end, the structure of FIGS. 15A–15C may be employed. As shown, the fixture 262 may be reciprocatingly moved from beneath the cylinder 232 and positioned below a vacuum transfer ring 270. The transfer ring 270 may be brought into contact with the band 248 with an appropriate vacuum lifting the band 248 from the fixture 262 for transfer to a tire mold 272. It will be appreciated that the transfer ring 270 will, most preferably, have a groove therein which is of the same size, orientation, and angle as the groove 264 within the fixture 262 to receive the band 248.

Figure 16:
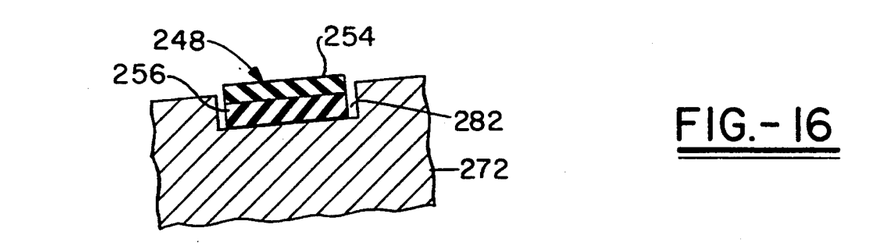
FIG. 16 is a partial sectional view of a tire curing mold showing an angled annular groove for receiving the white sidewall applique.

The tire mold 272 is adapted to receive a green tire, form the tire, generate a tread thereon, vulcanize, and cure the tire. Such structure is well known to those skilled in the art. Included in the interior of the mold 272 is a bladder 274 which is inflated during the curing process to an appropriate pressure. As shown in FIG. 16, the mold 272 includes a groove 282 therein, the same being substantially identical to the groove 264 of the fixture 262. The band 248 is centrally or uniformly positioned within the groove 282. Guide pins 276 extending from the mold 272 are adapted to engage the transfer ring 270 to assure such accurate positioning.

With the band 248 properly received within the groove 282, a green tire is then transferred into the mold 272 in standard fashion. The green tire forcefully engages the barrier layer 254 of the band 248 during the curing press operation. As presented earlier, with the cross sectional area of the band 248 being substantially equal to the cross sectional area of the groove 282, this forceful engagement causes the band 248 to fill the cavity of the groove 282 while remaining in intimate contact with the surface of the tire received within the mold. Accordingly, only the barrier stock 254 engages the black rubber of the tire, while white sidewall stock 256 is sharply and accurately defined by the walls of the groove 282.

Both the band 248 and the green tire 240 cure together within the mold 272, with the band 248 becoming fused or bonded by vulcanization to the tire. The tire curing process continues to completion in ordinary fashion.

Those skilled in the art will readily appreciate that the white sidewall forming fixture 262, containing a band 248, could be received by the tire mold 272 during the curing operation. This technique and structure would eliminate the need for the removal of the band 248 from the fixture 262 and the subsequent transfer of the band 248 to the mold 272. In such event, the mold 272 would simply be housed out to receive the entirety of the forming fixture 262.

It will further be appreciated by those skilled in the art that the band forming roll 230 will typically have an outside diameter which is substantially equal to the ultimate inside diameter of the white sidewall band. Further, it will be noted that bottom surfaces of the grooves 264 and 282 typically form a truncated cone, the angle of the side being equal to the angle of the tire surface to which the band is to be applied.

With reference again to FIGS. 13, and 14A–14D alternative embodiments of the invention may be appreciated. The roll 232 may be provided with segmented passages 258 in communication with each of the grooves. Each segmented passage 258 of each groove 252 encompasses about 300° of the 360° in the circumference of the drum 232.

In these alternate embodiments, the transfer or indexing ring 260 is eliminated. The forming fixture 262 is annular, receiving the roll 232 in a central aperture thereof. The roll 232 is adapted to move vertically in an indexing fashion to successively bring the bands 248 into juxtaposition with the fixture 262. Received within the roll 232 and in operative alignment with the fixture 262 is an appropriate mechanism to feed the next band 248 into the groove 264, such as the elements 266, 267, 269, 275 discussed above. As such band 248 has been formed and transferred as discussed above, the roll 232 is indexed to bring the next band 248 into position for the forming operation.

It is also contemplated as a portion of the invention that the forming roll 230 may serve as the storage cylinder 232. Since the forming roll 230 does not have circumferential grooves such as the grooves 252, the bands 248 will necessarily be dispensed directly from the smooth outer surface of the roll 230. In one embodiment, the bands 248 may be separated and spaced apart upon the roll 230 by means of the vacuum sleeve 250 as discussed above. Of course, the roll 230 would be elongated to accommodate such spacing. Dispensing of the bands 248 from the roll 230 would then proceed in any of the fashions discussed above.

Figure 17:
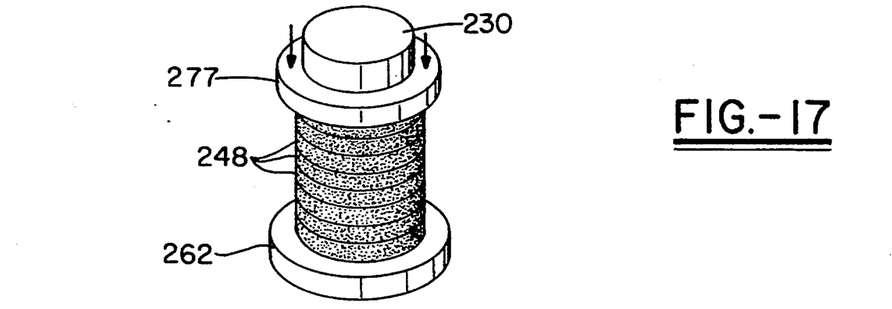
FIG. 17 is a perspective view of a storage roll, slide ring, and forming fixture according to an embodiment of the invention.

Still another embodiment of the invention contemplates that the roll 230 may serve as the storage cylinder without any requisite spacing of the bands therealong, but with the bands 248 abutted as cut. In this embodiment, shown in FIG. 17, the roll 230 maintaining the abutted bands 248 is inverted and coaxially aligned with an extending upwardly from the forming fixture 262. The bottom most band 248 is urged from the roll 230 and into the groove 264 of the forming fixture 262 in any of the manners discussed above. After the formed band is transferred from the fixture 262, the fixture returns to its position immediately beneath the roll 230 and the slide ring 277 slides the entire stack of bands 248 downward upon the roll 230 so that the bottom most band is in juxtaposition to the fixture 262 for the forming operation.

Thus it can be seen that the objects of the invention have been satisfied by the structure presented above. While in accordance with the patent statutes only the best mode and preferred embodiment of the invention has been presented and described in detail, it is to be understood that the invention is not limited thereto or thereby. Accordingly, for an appreciation of the true scope and breadth of the invention reference should be made to the following claims.

What is claimed is:

1. A method for applying a white sidewall applique to a tire, comprising the steps of:

mixing and calendering a layer of barrier rubber;
mixing and calendering a layer of white rubber;
laminating said layers into a laminate;
forming a cylinder of said laminate and cutting said cylinder of laminate into a plurality of bands; and
transferring one of said bands to a tire press and vulcanizing said band to a tire while curing said tire.

2. The method according to claim 1, further comprising the step of storing said plurality of bands on a storage cylinder following said forming and cutting.

3. The method according to claim 2, wherein said step of transferring comprises the step of urging said one of said bands from said storage cylinder onto a fixture maintained at an end of said storage cylinder.

4. The method according to claim 3 wherein said band urged from said storage cylinder changes shape and said step of changing shape of said band comprises stretching an outer circumferential edge of said band without stretching an inner circumferential edge thereof.

5. The method according to claim 2, wherein said step of storing comprises spacing said bands axially apart from each other upon said storage cylinder and received within grooves therein.

* * * * *